United States Patent [19]

Bilhou et al.

[11] Patent Number: 4,683,215
[45] Date of Patent: Jul. 28, 1987

[54] PROCESS FOR REMOVING CONTAMINANTS FROM A LIQUID TICL4 PHASE

[75] Inventors: Jean L. Bilhou, The Hague; Brian L. Goodall, Amsterdam, both of Netherlands

[73] Assignee: Shell Oil Company, Houston, Tex.

[21] Appl. No.: 860,941

[22] Filed: May 8, 1986

[30] Foreign Application Priority Data

May 22, 1985 [GB] United Kingdom ............... 8513000

[51] Int. Cl.$^4$ ............................................. C08F 4/64
[52] U.S. Cl. .................................. 502/107; 502/104; 502/111; 502/125; 502/127; 423/85
[58] Field of Search ............... 502/104, 107, 111, 125, 502/127; 423/85

[56] References Cited

U.S. PATENT DOCUMENTS

| | | | |
|---|---|---|---|
| 4,115,319 | 9/1978 | Scata et al. | 502/115 |
| 4,224,184 | 9/1980 | Staiger | 502/105 |
| 4,329,253 | 5/1982 | Goodall et al. | 502/111 |
| 4,393,182 | 7/1983 | Goodall et al. | 526/125 |
| 4,400,302 | 8/1983 | Goodall et al. | 502/104 |
| 4,414,132 | 11/1983 | Goodall et al. | 502/169 |
| 4,535,068 | 8/1985 | Job | 502/125 X |

Primary Examiner—Patrick P. Garvin

[57] ABSTRACT

A process for removing one or more contaminants of the formula $TiCl_3OR$, in which R is an alkyl or aryl group, from a liquid phase comprising $TiCl_4$, characterized in that the contaminants are reacted with an organic acid halide

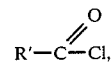

in which R' is an aryl or alkyl group, to precipitate an addition complex of the formula

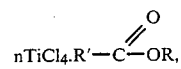

in which n is a number of from 0.3 to 3.0, and the addition complex is separated from the liquid phase.

15 Claims, No Drawings

PROCESS FOR REMOVING CONTAMINANTS FROM A LIQUID TICL4 PHASE

FIELD OF THE INVENTION

The present invention is concerned with a process for removing one or more contaminants of the formula $TiCl_3OR$ in which R is an alkyl or aryl group from a liquid phase comprising $TiCl_4$.

BACKGROUND OF THE INVENTION

Numerous proposals are known from the prior art to provide olefin polymerization catalysts by combining a solid component comprising at least magnesium, titanium and chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

Supported coordination catalysts of this type are disclosed in numerous patents. The catalyst systems of this type which have been disclosed in the prior art generally are able to produce olefin polymers in high yield and, in the case of catalysts for polymerization of propylene or higher alpha-olefins, with high selectivity to stereoregular polymer.

The objective of workers in this art is to provide catalyst systems which exhibit sufficiently high activity to permit the production of polyolefins in such high yield as to obviate the necessity of extracting residual catalyst components in a dashing step. In the case of propylene and higher olefins, an equally important objective is to provide catalyst systems of sufficiently high selectivity toward isotactic or otherwise stereoregular products to obviate the necessity of extracting atactic polymer components.

Although many chemical combinations provide active catalyst systems, practical considerations have led the workers in the art to concentrate on certain preferred components. The procatalysts typically comprise magnesium chloride, titanium chloride, generally in tetravalent form, and as electron donor an aromatic ester such as ethyl benzoate or ethyl-p-toluate. The cocatalyst typically is an aluminum trialkyl such as aluminum triethyl or aluminum tri-isobutyl, often used at least partially complexed with selectivity control agent. The selectivity control agent typically is an aromatic ester such as ethyl-paramethoxybenzoate(ethylanisate) or methyl-p-toluate.

While the selection of cocatalyst and selectivity control agent affects the performance of those catalyst systems, the component which appears to be subject to most significant improvement with respect to activity and productivity of the system is the procatalyst.

Preferred methods of preparing such procatalysts are claimed in U.S. Pat. Nos. 4,329,253; 4,393,182; 4,400,302; and 4,414,132. These procatalysts are highly active and stereospecific. The typical manner of preparing such procatalysts involves the reaction of the magnesium compound, titanium tetrachloride and electron donor. The resulting solid particles are then contacted with additional quantities of $TiCl_4$ and are completed by washing off excess $TiCl_4$ using light hydrocarbons (e.g., isooctane and isopentane) and drying.

As part of the typical process described above starting with magnesium alkoxides and $TiCl_4$, contaminants of the formula $TiCl_3OR$ are formed. While it would in principle be possible to remove these compounds by fractional distillation of the liquid phase, this method is however not adequately energy-efficient and in cases where the contaminants have a boiling point close to that of $TiCl_4$, this being so for $TiCl_3OC_2H_5$, the distillation route requires elaborate equipment and is not easy to implement in industrial plants.

A simpler method is therefore desirable and the technical problem underlying this invention is to achieve this.

SUMMARY OF THE INVENTION

The $TiCl_4$ working-up method of this invention is based on the following principles:

1. The contaminants $TiCl_3OR$ can be converted into $TiCl_4$ and esters by reacting with an organic acid halide, for example $TiCl_3OC_2H_5$ (ethoxy titanium trichloride) readily reacts with $C_6H_5$-COCl (benzoylchloride) to form $TiCl_4$ and ethylbenzoate. This reaction is known per se.
2. The esters readily react with $TiCl_4$ to form addition compounds or complexes, this reaction is also known per se.
3. The Applicants have found that the relevant addition complexes have a limited solubility in liquid $TiCl_4$, particularly at lower temperatures, so that they can be precipitated from the liquid $TiCl_4$ phase.

Accordingly, the invention provides a proces for removing one or more contaminants of the formula $TiCl_3OR$, in which R is an alkyl or aryl group, from a liquid phase comprising $TiCl_4$, characterized in that the contaminants are reacted with an organic acid halide

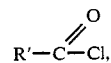

in which R' is an aryl or alkyl group, to precipitate an addition complex of the formula

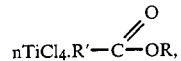

in which n is a number of from 0.3 to 3.0, and the precipitated complex is separated from the liquid phase.

DETAILED DESCRIPTION OF THE INVENTION

While the invention includes the use of a binary liquid phase system, it is preferred to employ a liquid phase that contains a liquid halohydrocarbon diluent in addition to the $TiCl_4$ and $TiCl_3OR$ components, provided the presence of this diluent does not bring about a substantial modification of the limited solubility of the envisaged addition complex. When halohydrocarbons are employed, preferred weight ratios to TiCl$_4$ vary in the range of from 30:70 to 70:30. Suitable halohydrocarbons are aliphatic halohydrocarbons with up to 12 carbon atoms, e.g. 1,2-dichloroethane, trichloropropane, hexchloroethane, tetrachloromethane, 2-chlorobutane, 1-chloroisooctane, etc. and aromatic halohydrocarbons, e.g. 2,3-dichloronaphthene, 1,2- 1,3- or 1,4-dichlorobenzene, 2-chlorotoluene or monochlorobenzene, the latter being a preferred compound.

The organic acid halide can be selected from aromatic and aliphatic acid halides, from the latter group of compounds those in which R' represents an alkyl group with from 1 to 12 carbon atoms, e.g. ethyl, n-propyl, isopropyl, hexyl or cyclohexyl are preferred. Particularly suitable are acid halides in which R' represents substituted or unsubstituted phenyl. Substituted phenyl groups refer to those phenyl groups having substituents on the benzene ring selected from the group consisting of halogens, C$_1$-C$_6$ alkyl groups and C$_1$-C$_6$ alkoxy groups. Examples of substituted phenyl groups include p-methoxy phenyl, p-methyl phenyl, 3,5-dichloro phenyl, and the like. Preferably, R' is a phenyl group containing only H or electron withdrawing substituents on the benzene ring and X is a chloride or bromide. Most preferred is benzoylchloride.

In the complex

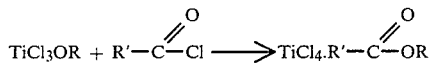

the preferred values of n are within the range of from 0.75 to 1.30.

These values can be produced by adjusting the amount of organic acid halide to be added to the contaminated TiCl$_4$ comprising a known amount of TiCl$_3$OR. The concentration of the latter in the liquid phase shall normally be less than 300 g/kg TiCl$_4$ and more than 15 g/kg TiCl$_4$. In the most preferred reactions one will employ the acid halide in a stoichiometric amount, thus enabling the reaction:

$$TiCl_3OR + R'-\overset{O}{\underset{\|}{C}}-Cl \longrightarrow TiCl_4.R'-\overset{O}{\underset{\|}{C}}-OR$$

Preferred groups OR are alkoxy groups of from 1 to 8 carbon atoms, with ethoxy groups being most preferred.

This reaction proceeds rapidly when the temperature of the liquid phase is above 60° C., preferably at least 90° C. At lower temperatures, more time is needed for the required conversion. At the aforesaid elevated temperatures the addition complex is relatively soluble in the liquid phase, however a rapid precipitation occurs when the liquid phase is cooled to a temperature of less that 15° C. At higher temperatures the precipitation is more slow and less quantitative.

The process of the invention is of particular interest for the preparation of solid catalyst components for the polymerization of 1-alkenes, such as ethylene, propylene, butene-1, octene-1, etc., based upon the halogenation of e.g. magnesiumalkoxy or -aryloxychloride or magnesiumdialkoxide or -diaryloxide with TiCl$_4$ in the presence of a liquid halohydrocarbon as disclosed in U.S. Pat. No. 4,414,132. Upon filtering the liquid phase to isolate the solid product of the halogenation reaction one obtains a liquid phase comprising TiCl$_4$, a halohydrocarbon and a contaminating compound of the formula TiCl$_3$OR.

The process of U.S. Pat. No. 4,414,132 further prescribes a second step to produce the desired solid catalyst component. This step involves the reaction of the aforesaid solid reaction product with liquid TiCl$_4$. In that reaction the co-presence of TiCl$_3$OR contaminants is not desired but when these contaminants are removed with the process of this invention the purified liquid TiCl$_4$ can very well be used as the reactant for the second step of the process of U.S. Pat. No. '132.

Accordingly this invention is also concerned with a process for preparing a solid catalyst component for 1-alkene polymerization which comprises:

(1) reacting TiCl$_4$ with a compound of the formula Mg(OR)$_n$Cl$_{2-n}$ in which R is an alkyl or aryl group, in the presence of a halohydrocarbon, (2) separating the solid product so obtained from the liquid phase, (3) reacting the liquid phase which is contaminated with a compound of the formula TiCl$_3$OR with an organic acid halide of the formula

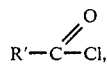

n which R' is an aryl or alkyl group, to precipitate an addition complex of the formula

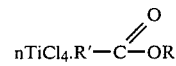

wherein n is a number of from 0.3 to 3.0, (4) separating the solid addition complex from the liquid phase, (5) slurrying the solid product of step (1) in the latter liquid phase at a temperature of at least 60° C. during at least 0.5 hours, followed by (6) separating the solid reaction product from the liquid phase.

It is preferred to carry out the first reaction step in the co-presence of an electron donor (Lewis base), preferably an aromatic ester of an aliphatic alcohol, e.g. ethylbenzoate.

The liquid phase obtained in step (6) may be recycled into step (1), optionally following purification in line with the method of steps (3) and (4). The latter would be particularly useful if in step (3) an excess of organic acid halide instead of the stoichiometric amount is employed.

In polymerizing 1-alkenes, particular propylene or mixtures of propylene and up to 20% mol of ethylene the solid catalyst components may be applied in any manner known per se, preference is given to the method disclosed in U.S. Pat. No. '132. The best catalyst systems comprise as co-catalyst a combination of a trialkylaluminum compound and an aromatic ester of an aliphatic alcohol, e.g. one of the compounds referred to in GB-A No. 1,387,890, preferably p.ethoxyethylbenzoate or p.methoxyethylbenzoate. Instead of using a single trialkylaluminum compound one may also employ such compound in admixture with a dialkylaluminum halide.

The invention is illustrated by the following examples:

EXAMPLE I 135 g of magnesiumethoxychloride and 61 g of ethylbenzoate are stirred in 4.3 kg of a 50:50 vol mixture of TiCl$_4$ and monochlorobenzene at 100° C. during 1.5 hours. 175 g of solid reaction product (A) is removed from the liquid phase to which 183 g of benzoylchloride then is added at 95° C. The liquid phase is stirred for 10 min, then cooled to 10° C. to precipitate 485 g of the solid yellow complex TiCl$_4$.C$_6$H$_5$COOC$_2$H$_5$. Subsequent to filtration, the volume ratio of the liquid phase is readjusted to 50:50 by addition of 285 g of TiCl$_4$ and product A is dispersed in the latter liquid phase. The temperature is increased to 105° C. and the dispersion is stirred during 3 hours. Upon filtration 172 g of the solid product (A') are washed with isopentane at 30° C. during 1.5 hours.

EXAMPLE II 150 g of magnesiumdiethoxide and 57 g of ethylbenzoate are stirred in 4.5 kg of a 50:50 vol. mixture of TiCl$_4$ and monochlorobenzene at 105° C. during 1.7 hours. 172 g of solid reaction product (B) is removed from the liquid phase to which 370 g of benzoylchloride then is added at 90° C. The liquid phase is stirred for 20 min., then cooled to 15° C. to precipitate 970 g of the solid yellow complex TiCl$_4$.C$_6$H$_5$COOC$_2$H$_5$. Subsequent to filtration, the volume ratio of the liquid phase is readjusted to 50:50 by addition of 560 g of TiCl$_4$ and product B is dispersed in the latter liquid phase. The temperature is increased to 100° C. and the dispersion is stirred during 2.7 hours. Upon filtration 169 g of the solid product (B') are washed with isopentane at 25° C. during 1.7 hours.

EXAMPLE III

Solids A' and B' were tested in liquid propylene polymerization using the following standard conditions:
co-catalyst: triethylaluminum/p.ethoxy ethylbenzoate 1.3:1 molar
Al:Ti ratio: 40:1
Ti concentration: 0.27 mg Ti/l
pressure: 2900 kPa
temperature: 67° C.
time: 1 hour
H$_2$ concentration: 2% vol.

The polymer yields are 19.5 kg/g A' and 18.2 kg/g B'.

What is claimed is:

1. A process for removing one or more contaminants of the formula TiCl$_3$OR, in which R is an alkyl or aryl group, from a liquid phase comprising TiCl$_4$ and said contaminants, said process comprising:
   (a) reacting said contaminants with an organic acid halide of the formula

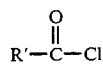

where R' is an alkyl or aryl group, therein precipitating an addition complex of the formula

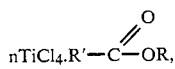

in which n has a value from about 0.3 to about 3.0; and
   (b) separating the addition complex from the liquid phase.

2. The process of claim 1 in which the liquid phase comprises TiCl$_4$ and a halohydrocarbon in addition to said contaminants.

3. The process of claim 2 wherein the weight ratio of TiCl$_4$ and halohydrocarbon in the liquid phase is from 30:70 to 70:30.

4. The process of claim 2 wherein the halohydrocarbon is monochlorobenzene.

5. The process of claim 1 wherein subsequent to reaction with said organic acid halide, the liquid phase is cooled to a temperature of less than about 15° C.

6. The process of claim 1 wherein the group—OR represents an alkoxy group of from 1 to 8 carbon atoms.

7. The process of claim 6 wherein the group—OR is an ethoxy group.

8. The process of claim 1 wherein R' is a substituted phenyl group having substituents on the benzene ring selected from the group consisting of halogens, C$_1$–C$_6$ alkyl groups and C$_1$–C$_6$ alkoxy groups.

9. The process of claim 1 wherein said organic acid halide is benzoylchloride.

10. A process for preparing a solid catalyst component for 1-alkene polymerization which comprises:
   (1) reacting TiCl$_4$ with magnesium alkyoxy or -aryloxychloride in the presence of a halohydrocarbon in a liquid phase,
   (2) separating the solid product so obtained from the liquid phase,
   (3) reacting the liquid phase which is contaminated with a compound of the formula TiCl$_3$OR with an organic acid halide of the formula

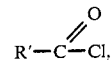

wherein R' is an aryl or alkyl group, to precipitate an addition complex of the formula

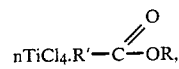

wherein n is a number of from 0.3 to 3.0,
   (4) separating the solid addition complex from the liquid phase,
   (5) slurrying the solid product of step (1) in the latter liquid phase at a temperature of at least 60° C. during at least 0.5 hours, followed by
   (6) separating the solid reaction product form the liquid phase.

11. A process for preparing a solid catalyst component for 1-alkene polymerization which comprises:
   (1) reacting TiCl$_4$ with magnesiumdialkoxide or -diaryloxide in the presence of a halohydrocarbon in a liquid phase,
   (2) separating the solid product so obtained from the liquid phase,
   (3) reacting the liquid phase which is contaminated with a compound of the formula TiCl$_3$OR with an organic acid halide of the formula

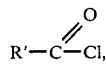

wherein R' is an aryl or alkyl group, to precipitate an addition complex of the formula

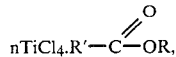

wherein n is a number of from 0.3 to 3.0, (4) separating the solid addition complex from the liquid phase, (5) slurrying the solid product of step (1) in the latter liquid phase at a temperature of at least 60° C. during at least 0.5 hours, followed by (6) separating the solid reaction product form the liquid phase.

12. A process for preparing a solid catalyst compound for 1-alkene polymerization which comprises:

(1) reacting $TiCl_4$ with MgR'R" wherein R' is an alkoxide or aryloxide group and R" is an alkoxide or aryloxide or halogen in the presence of a halohydrocarbon in a liquid phase, (2) separating the solid product so obtained from the liquid phase, (3) reacting the liquid phase which is contaminated with a compound of the formula $TiCl_3OR$ with an organic acid halide of the formula

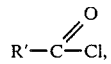

wherein R' is an aryl or alkyl group, to precipitate an addition complex of the formula

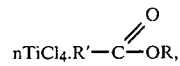

wherein n is a number of from 0.3 to 3.0, (4) separating the solid addition complex from the liquid phase, (5) slurrying the solid product of step (1) in the latter liquid phase at a temperature of at least 60° C. during at least 0.5 hours, followed by (6) separating the solid reaction product form the liquid phase.

13. The process of claim 10 or 12 in which step (1) is carried out in the presence of an electron donor.

14. The process of claim 13 in which the electron donor is an aromatic ester of an aliphatic alcohol.

15. The process of claim 1 wherein R' is an aryl group containing electron-withdrawing substituents on the benzene ring.

* * * * *